(12) United States Patent
Yoshimura

(10) Patent No.: US 11,470,292 B2
(45) Date of Patent: Oct. 11, 2022

(54) PROJECTION IMAGE ADJUSTING METHOD AND PROJECTION APPARATUS

(71) Applicant: SEIKO EPSON CORPORATION, Tokyo (JP)

(72) Inventor: Jun Yoshimura, Beppu (JP)

(73) Assignee: SEIKO EPSON CORPORATION, Tokyo (JP)

( * ) Notice: Subject to any disclaimer, the term of this patent is extended or adjusted under 35 U.S.C. 154(b) by 418 days.

(21) Appl. No.: 16/794,369

(22) Filed: Feb. 19, 2020

(65) Prior Publication Data

US 2020/0267361 A1    Aug. 20, 2020

(30) Foreign Application Priority Data

Feb. 20, 2019  (JP) .............................. JP2019-028165

(51) Int. Cl.
 *H04N 9/31* (2006.01)

(52) U.S. Cl.
 CPC ......... *H04N 9/3194* (2013.01); *H04N 9/3185* (2013.01)

(58) Field of Classification Search
 CPC .... H04N 9/3194; H04N 9/3185; H04N 9/317; G03B 21/142
 See application file for complete search history.

(56) References Cited

U.S. PATENT DOCUMENTS

| 5,738,429 A | * | 4/1998 | Tagawa | G03B 21/132 353/122 |
| 2005/0018144 A1 | * | 1/2005 | Wada | H04N 5/74 353/69 |
| 2006/0050244 A1 | * | 3/2006 | Kamimura | H04N 9/3185 353/70 |
| 2009/0015730 A1 | * | 1/2009 | Arakawa | H04N 9/3185 348/744 |
| 2009/0046258 A1 | * | 2/2009 | Schnuckle | G03B 21/14 353/94 |
| 2011/0175940 A1 | | 7/2011 | Terauchi et al. | |
| 2013/0010371 A1 | * | 1/2013 | Otani | G02B 13/16 359/668 |
| 2013/0027676 A1 | * | 1/2013 | Otani | G03B 21/142 353/97 |
| 2018/0143443 A1 | * | 5/2018 | Fujita | G09G 5/02 |
| 2019/0037186 A1 | | 1/2019 | Yoshimura | |

FOREIGN PATENT DOCUMENTS

| JP | 2011-154345 A | 8/2011 |
| JP | 2011-227119 A | 11/2011 |
| JP | 2019-028441 A | 2/2019 |

\* cited by examiner

*Primary Examiner* — John W Miller
*Assistant Examiner* — Humam M Satti
(74) *Attorney, Agent, or Firm* — Oliff PLC

(57) ABSTRACT

A projection image including a test pattern is projected on a projection surface. The projection image is moved in a first direction. An image of the projection image is captured. A change in the test pattern contained in the projection image the image of which has been captured is detected. When a change in the test pattern is detected, it is determined that the projection image has reached an end of the projection surface.

10 Claims, 15 Drawing Sheets

PROJECTION IMAGE ADJUSTING METHOD AND PROJECTION APPARATUS

The present application is based on, and claims priority from JP Application Serial Number 2019-028165, filed Feb. 20, 2019, the disclosure of which is hereby incorporated by reference herein in its entirety.

BACKGROUND

1. Technical Field

The present disclosure relates to a projection image adjusting method and a projection apparatus.

2. Related Art

To cause a projector as a projection apparatus to project an image on a screen, there is a known lens shift function that allows adjustment of the projection position on the screen with no movement of the main body of the projector. For example, the projector described in JP-A-2011-227119 allows the image projection position on the screen to be changed by moving the position of a projection lens based on a user's operation in directions perpendicular to the optical axis of the projection lens.

In a case where the user desires to move the image projection position to an end of the screen so that an end of the image is close to the end of the screen, the end of the image undesirably is out of the screen in some cases because the lens shift operation moves the projected image on the screen at a fixed speed, causing a problem of a difficulty in the user's adjustment. Further, in a projector in which a light modulator, such as a liquid crystal panel, forms an image, the same problem occurs with a configuration in which the projection position on the screen is adjusted by changing the position where the image is formed in the light modulator based on a user's operation.

SUMMARY

A projection image adjusting method according to the present application includes projecting a projection image including a test pattern on a projection surface, moving the projection image in a first direction, capturing an image of the projection image, detecting a change in the test pattern contained in the projection image the image of which has been captured, determining that the projection image has reached an end of the projection surface when a change in the test pattern is detected, and suppressing the movement of the projection image in the first direction when it is determined that the projection image has reached the end of the projection surface.

In the projection image adjusting method described above, the test pattern may be so disposed as to surround the projection image.

In the projection image adjusting method described above, when an amount of change in the test pattern is greater than or equal to a predetermined value, it may be determined that the projection image has reached the end of the projection surface.

In the projection image adjusting method described above, when it is determined that the projection image has reached the end of the projection surface, a speed at which the projection image is moved may be changed from a reference speed to a low speed.

In the projection image adjusting method described above, when it is determined that the projection image has reached the end of the projection surface, the movement of the projection image may be terminated.

In the projection image adjusting method described above, when it is determined that the projection image has reached the end of the projection surface, the projection image may be moved in a second direction that is opposite the first direction.

A projection apparatus according to the present application includes a projection section that projects a projection image including a test pattern on a projection surface, a position adjuster that moves the projected projection image in a first direction, an imager that captures an image of the projection image, a detector that detects a change in the test pattern contained in the projection image the image of which has been captured; an evaluator that determines that the projection image has reached an end of the projection surface when the detector detects a change in the test pattern, and a controller that suppresses the movement of the projection image moved in the first direction by the position adjuster when the evaluator determines that the projection image has reached the end of the projection surface.

In the projection apparatus described above, the test pattern may be so disposed as to surround the projection image.

In the projection apparatus described above, when an amount of change in the test pattern detected by the detector is greater than or equal to a predetermined value, the evaluator may determine that the projection image has reached the end of the projection surface.

In the projection apparatus described above, when the evaluator determines that the projection image has reached the end of the projection surface, the controller may cause the position adjuster to change a speed at which the projection image is moved from a reference speed to a low speed.

In the projection apparatus described above, when the evaluator determines that the projection image has reached the end of the projection surface, the controller may cause the position adjuster to terminate the movement of the projection image.

In the projection apparatus described above, when the evaluator determines that the projection image has reached the end of the projection surface, the controller may cause the position adjuster to move the projection image in a second direction that is opposite the first direction.

DESCRIPTION OF EXEMPLARY EMBODIMENTS

A projection image adjusting method and a projection apparatus according to embodiments will be described below with reference to the drawings.

First Embodiment

Figure 1:
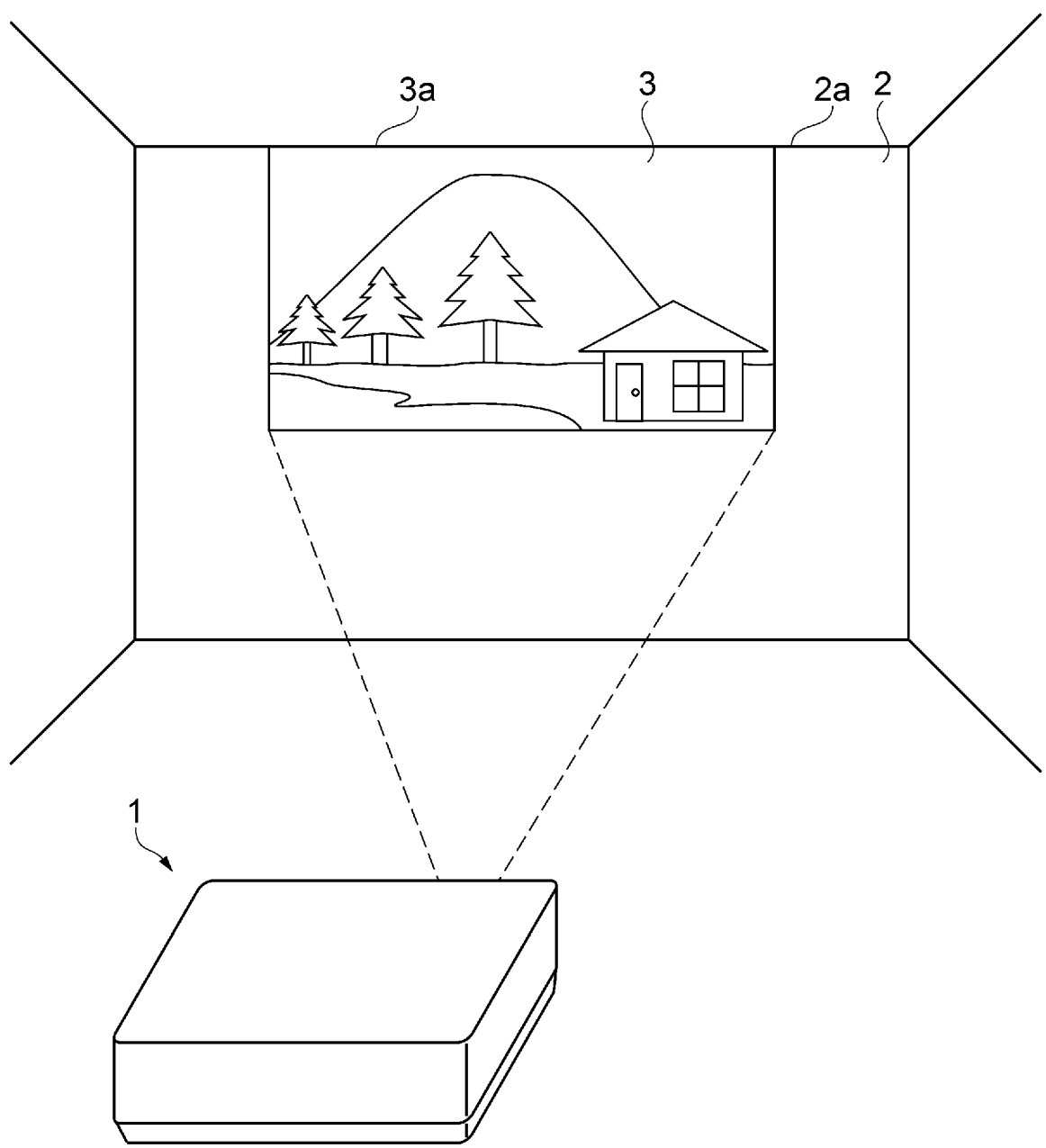
FIG. 1 is a schematic view showing the configuration of a projection apparatus.

FIG. 1 is a schematic diagram showing the configuration of a projection apparatus according to the present embodiment. The configuration of the projection apparatus will be described below with reference to FIG. 1.

A projector 1 as the projection apparatus projects and displays an image based on an externally inputted image signal on a projection surface 2, as shown in FIG. 1. The projection surface 2 is, for example, a wall of a room. In a case where a user desires to perform the projection in such a way that an edge 3a of a projection image 3 coincides with an end 2a of the projection surface 2, the projection image 3 is projected as shown in FIG. 1.

Figure 2:
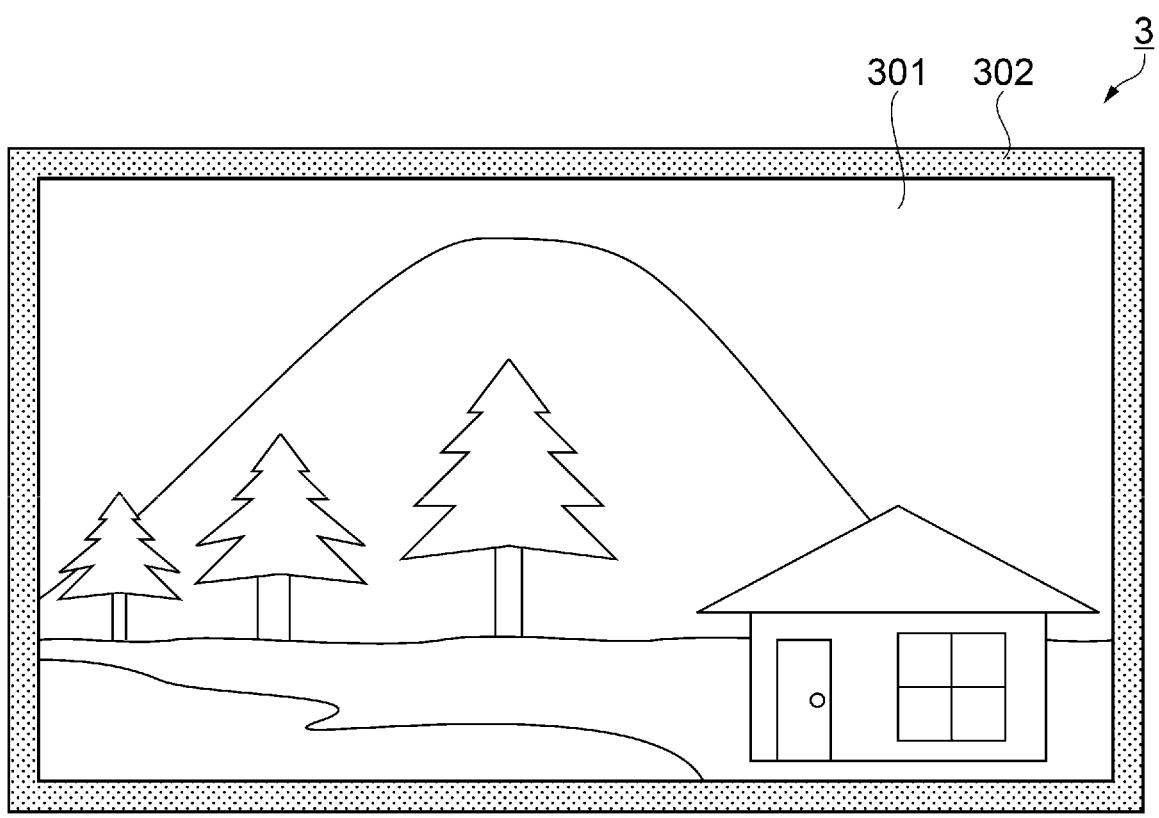
FIG. 2 shows the configuration of a projection image.

FIG. 2 shows the configuration of the projection image. The configuration of the projection image will be described below with reference to FIG. 2.

The projection image 3 includes an image 301 viewed by the user and a test pattern 302 so disposed as to surround the image 301, as shown in FIG. 2. The image 301 may be a still image or motion images. The test pattern 302 is used to evaluate whether or not the end 3a of the projection image 3 has reached the end 2a of the projection surface 2 when the position of the projection image 3 is so adjusted that the edge 3a of the projection image 3 coincides with the end 2a of the projection surface 2 as shown in FIG. 1.

Specifically, when the user adjusts the position where the projection image 3 is projected, the projector 1 captures an image of the projection surface 2 and detects a change in the test pattern 302 from the captured image. A change in the test pattern 302 allows the projector 1 to determine that the projection image 3 has reached the end 2a of the projection surface 2. No change in the test pattern 302 allows the projector 1 to determine that the projection image 3 has not reached the end 2a of the projection surface 2.

Figure 3:
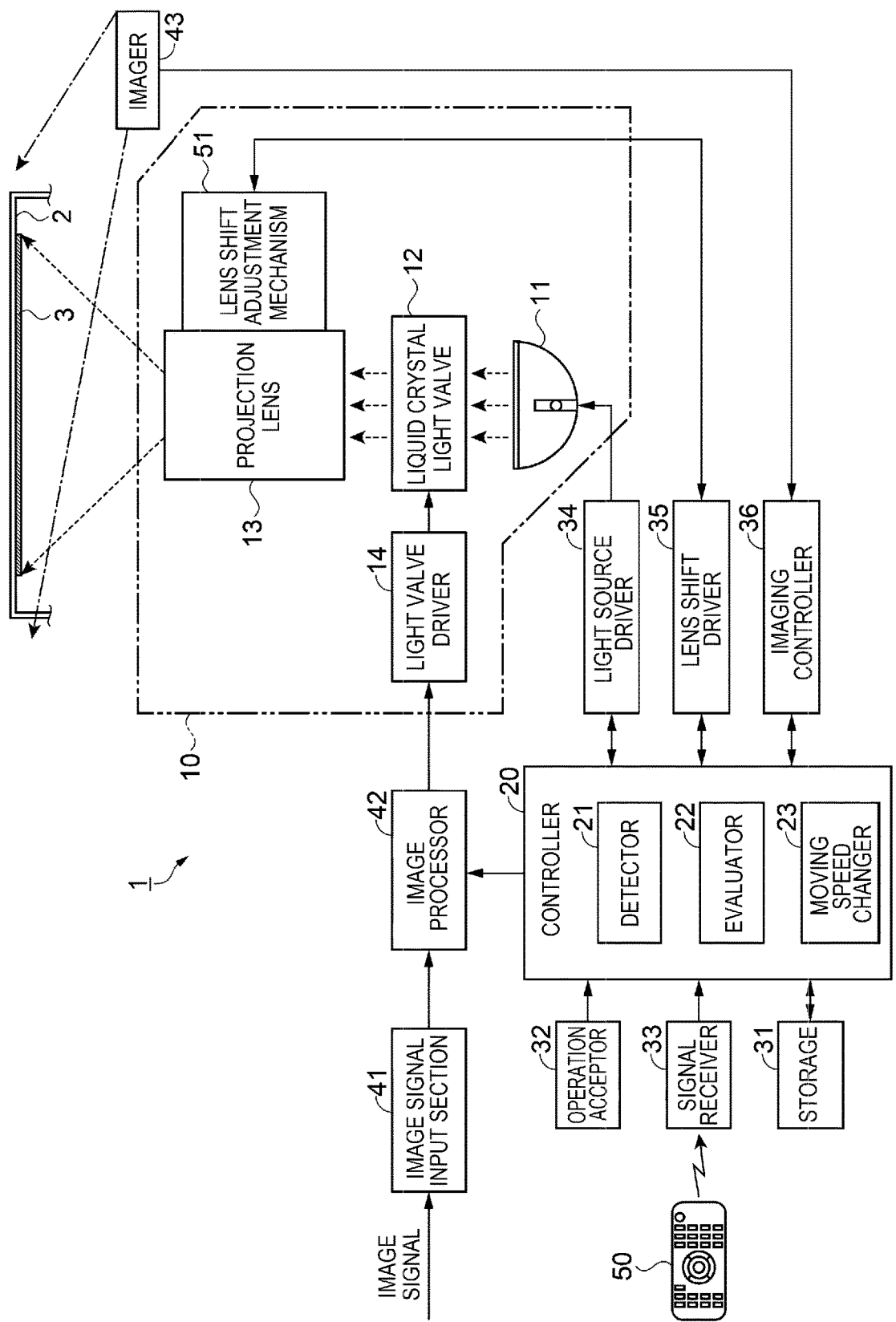
FIG. 3 is a block diagram showing the configuration of a projector.

FIG. 3 is a block diagram showing the configuration of the projector. The configuration of the projector will be described below with reference to FIG. 3.

The projector 1 includes a projection section 10, a controller 20, a storage 31, an operation acceptor 32, a signal receiver 33, a light source driver 34, a lens shift driver 35, an imaging controller 36, an image signal input section 41, an image processor 42, an imager 43, a remote control 50, and other components, as shown in FIG. 3.

The projection section 10 includes a light source 11, which includes a discharge-type light source, such as an ultrahigh-pressure mercury lamp and a metal halide lamp, or a solid-state light source, such as an LED (light emitting diode) and a laser, a liquid crystal light valve 12, a projection lens 13, a light valve driver 14, which drives the liquid crystal light valve 12, and a lens shift adjustment mechanism 51. In the present embodiment, the projection section 10 includes a portion corresponding to a display section that enlarges light modulated by the liquid crystal light valve 12 via the projection lens 13 and displays the projection image 3 on the projection surface 2. The light source driver 34 supplies or stops supplying the light source 11 with electric power based on an instruction from the controller 20 to switch the turned-on state to the turned-off state of the light source 11 and vice versa.

The liquid crystal light valve 12 functions as a modulation section and is formed, for example, of a transmissive liquid crystal panel so configured that a liquid crystal material is encapsulated between a pair of transparent substrates. The liquid crystal light valve 12 is so driven by the light valve driver 14 that drive voltage according to the image signal is applied to each pixel of the liquid crystal light valve 12 and the pixel then transmits and modulates light at optical transmittance according to the image signal.

The light outputted from the light source 11 passes through the liquid crystal light valve 12, which modulates the light, and the projection lens 13 projects the modulated light to display the projection image 3 according to the image signal on the projection surface 2.

The modulation section does not necessarily operate based on the method using the liquid crystal light valve 12, and it is conceivable to use another method, such as a digital light processing (DLP) method and a liquid crystal on-screen (LCOS) method.

The lens shift adjustment mechanism 51 is formed, for example, of a motor and a gear that move the projection lens 13 in two directions perpendicular to the optical axis of the projection lens 13 and moves the projection lens 13 at a predetermined speed based on a drive signal from the lens shift driver 35. The position where the projection image 3 is projected is thus moved at a moving speed according to the predetermined speed upward, downward, rightward, and leftward on the projection surface 2.

The lens shift adjustment mechanism 51 detects the amount of movement of the projection lens 13 as the amount of lens shift. The lens shift adjustment mechanism 51 then outputs the detected amount of lens shift to the lens shift driver 35. In the present embodiment, the lens shift adjustment mechanism 51 and the lens shift driver 35 correspond to a position adjuster that moves the projection image 3.

In the present embodiment, as a method for detecting the amount of lens shift, the amount of change in the position of the projection lens 13 is detected, for example, with an encoder. As another method for detecting the amount of lens shift, a stepper motor may be used as the motor of the lens shift adjustment mechanism 51, and the detection of the amount of lens shift may be performed based on the number of steps over which the stepper motor has been driven.

The imager 43 includes an imaging optical system, an imaging device, such as a CCD and a CMOS device, an interface circuit, and other components, performs imaging in the projection direction of the projection lens 13, and outputs captured image data on the captured image. The imaging optical system of the imager 43 is so disposed as to face in the same direction in which the projection lens 13 faces and has an angle of view that allows the imager 43 to perform the imaging over a range wider than the projection surface 2.

The controller 20 include one or more processors and operates in accordance, for example, with a control program stored in the storage 31 to oversee and control the action of the projector 1.

The storage 31 includes a memory, such as a RAM (random access memory) and a ROM (read only memory). The RAM is used to temporarily store a variety of data and other pieces of information, and the ROM stores the control program, control data, and other pieces of information for controlling the action of the projector 1. The storage 31 may further store an image signal for the projection via the projection section 10.

For example, the controller 20 has the following function: That is, when the controller 20 accepts operation that instructs movement of the projection lens 13, the controller 20 instructs the lens shift adjustment mechanism 51 to move the projection lens 13 in such a way that the projection image 3 moves in a first direction based on the user's operation. Functional portions provided by the controller 20 will be described later in detail.

The operation acceptor 32 includes a plurality of operation keys that allow the user to issue a variety of instructions to the projector 1. The operation keys provided on the operation acceptor 32 include a power key for switching the powered-on state to the powered-off state of the projector 1 and vice versa, a menu key for displaying a menu screen for a variety of settings, an input switch key for switching an inputted image signal to another, an adjustment start key for starting the lens shift adjustment, a cursor key for instructing movement of a cursor on the menu screen and the direction and amount of the lens shift adjustment, a finalizing key for finalizing any of the variety of settings, and other keys. When the user operates any of the variety of operation keys on the operation acceptor 32, the operation acceptor 32 accepts the operation and outputs an operation signal according to the content of the operation to the controller 20.

The remote control 50 issues an operation signal, such as infrared light, according to the user's operation content to issue a variety of instructions to the main body of the projector 1. The remote control 50 is covered with an enclosure, and a plurality of operation keys are provided on the surface of the enclosure.

The operation keys provided on the remoted control 50 include a power key for switching the power-on state to the power-off state of the projector 1 and vice versa, a menu key for displaying the menu screen for a variety of settings, an input switch key for switching an inputted image signal to another, an adjustment start key for starting the lens shift adjustment, a cursor key for instructing movement of the cursor on the menu screen and the direction and amount of the lens shift adjustment, a finalizing key for finalizing any of the variety of settings, and other keys, as in the case of the operation acceptor 32. The operation signal issued by the remote control 50 is received by the signal receiver 33.

The signal receiver 33 includes an infrared light receiving module, receives the operation signal issued by the remote control 50, and outputs the received operation signal as control information to the controller 20.

The light source driver 34 supplies or stops supplying the light source 11 with electric power based on an instruction from the controller 20 to switch the turned-on state to the turned-off state of the light source and vice versa.

The lens shift driver 35 generates a drive signal that drives the lens shift adjustment mechanism 51 based on an instruction from the controller 20 and transmits the generated drive signal to the lens shift adjustment mechanism 51 to move the projection lens 13.

In the present embodiment, when the user selects an item representing the lens shift from the menu screen displayed by the user's pressing of the menu key and presses the cursor key, the lens shift driver 35 moves the projection lens 13 by a predetermined distance at a reference speed in a direction corresponding to a portion of the cursor key that is the portion pressed by the user. The projection image 3 projected on the projection surface 2 is thus moved by a predetermined amount. Further, the lens shift driver 35 changes the speed at which the projection lens 13 is moved based on a speed change instruction from the controller 20. The lens shift driver 35 may acquire the amount of lens shift by which the projection lens 13 has been moved from the lens shift adjustment mechanism 51 and feed back the acquired amount of lens shift to the controller 20.

The imaging controller 36 causes the imager 43 to perform imaging and output the resultant captured image data based on an instruction from the controller 20. In the present embodiment, when the imaging controller 36 instructs the imager 43 to perform imaging, the imager 43 captures an image of an area containing the projection image 3 projected on the projection surface 2 and outputs captured image data produced as a result of the imaging to the controller 20. The controller 20 instructs the imaging controller 36 to perform imaging at predetermined time intervals during the movement of the projection image 3 in response to the execution of the lens shift process.

The image signal input section 41 includes a variety of image input terminals to each of which an external image supplier (not shown), such as a personal computer, a video reproduction apparatus, a memory card, a USB storage, and a digital camera, is connected via a cable, and an image signal is inputted from the image supplier to the image signal input section 41. The image signal input section 41 converts the inputted image signal into image data expressed in a format processable by the image processor 42 and outputs the image data to the image processor 42.

The image processor 42 performs a variety of types of image quality adjustment, such as adjustment of brightness, contrast, sharpness, and color tone and gamma correction, on the image data inputted from the image signal input section 41 based on an instruction from the controller 20. The image processor 42 outputs the adjusted and processed image data to the light valve driver 14.

When the light valve driver 14 drives the liquid crystal light valve 12 in accordance with the image data inputted from the image processor 42, the liquid crystal light valve 12 modulates the light incident from the light source 11 in accordance with the image data into image light, and the image light is projected via the projection lens 13.

The controller 20 includes a detector 21, an evaluator 22, and a moving speed changer 23 as the functional portions. The detector 21 detects a change in the test pattern 302 contained in the image captured by the imager 43. When the detector 21 detects a change in the test pattern 302, the evaluator 22 determines that the end 3a of the projection image 3 has reached the end 2a of the projection surface 2.

The moving speed changer 23 instructs the lens shift driver 35 to change the speed at which the projection lens 13 is moved. Specifically, the lens shift driver 35 issues an instruction of change in the speed at which the projection lens 13 is moved from the reference speed described above to a low speed slower than the reference speed or change in the speed at which the projection lens 13 is moved from the low speed to the reference speed.

Figure 4:
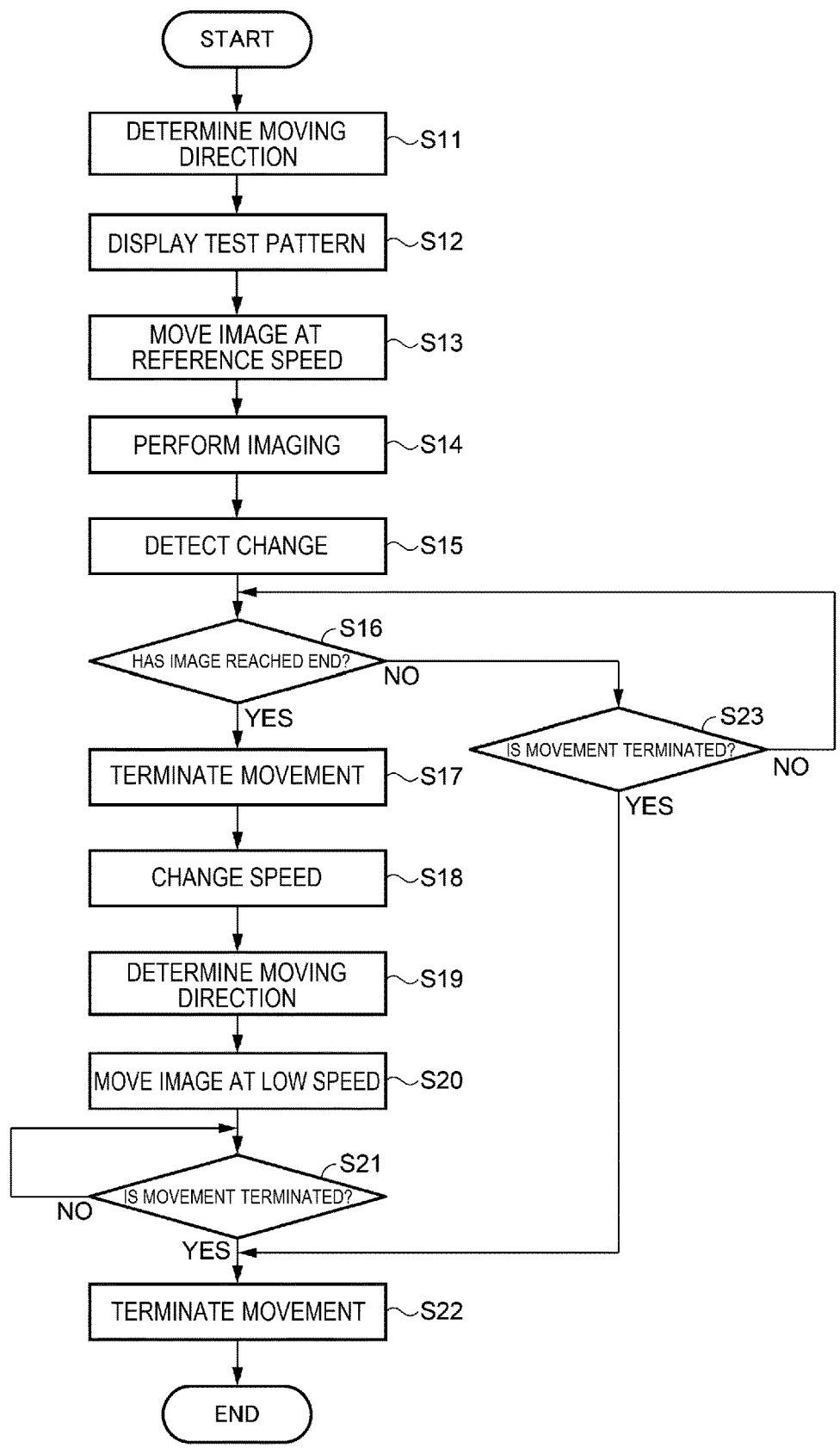
FIG. 4 is a flowchart showing a projection image adjusting method.
Figure 5:
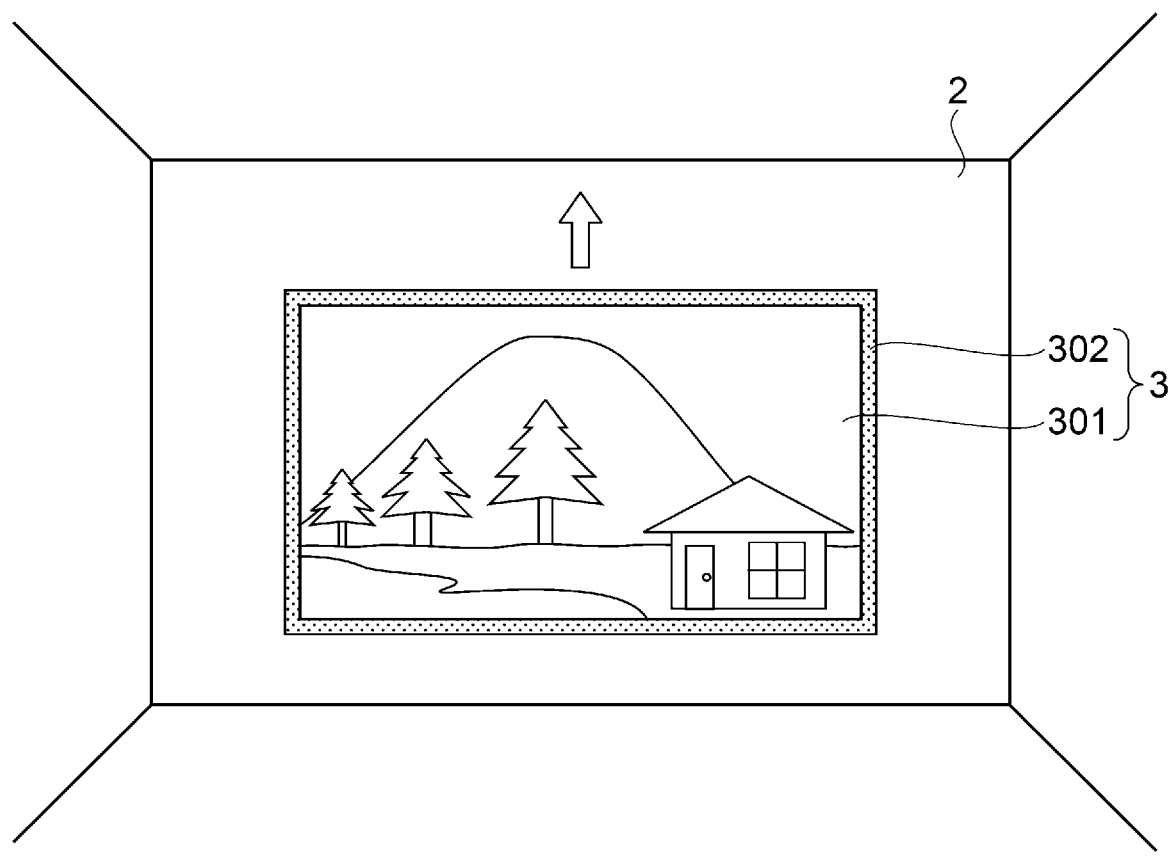
FIG. 5 shows a projection image displayed on a projection surface in the projection image adjustment.
Figure 6:
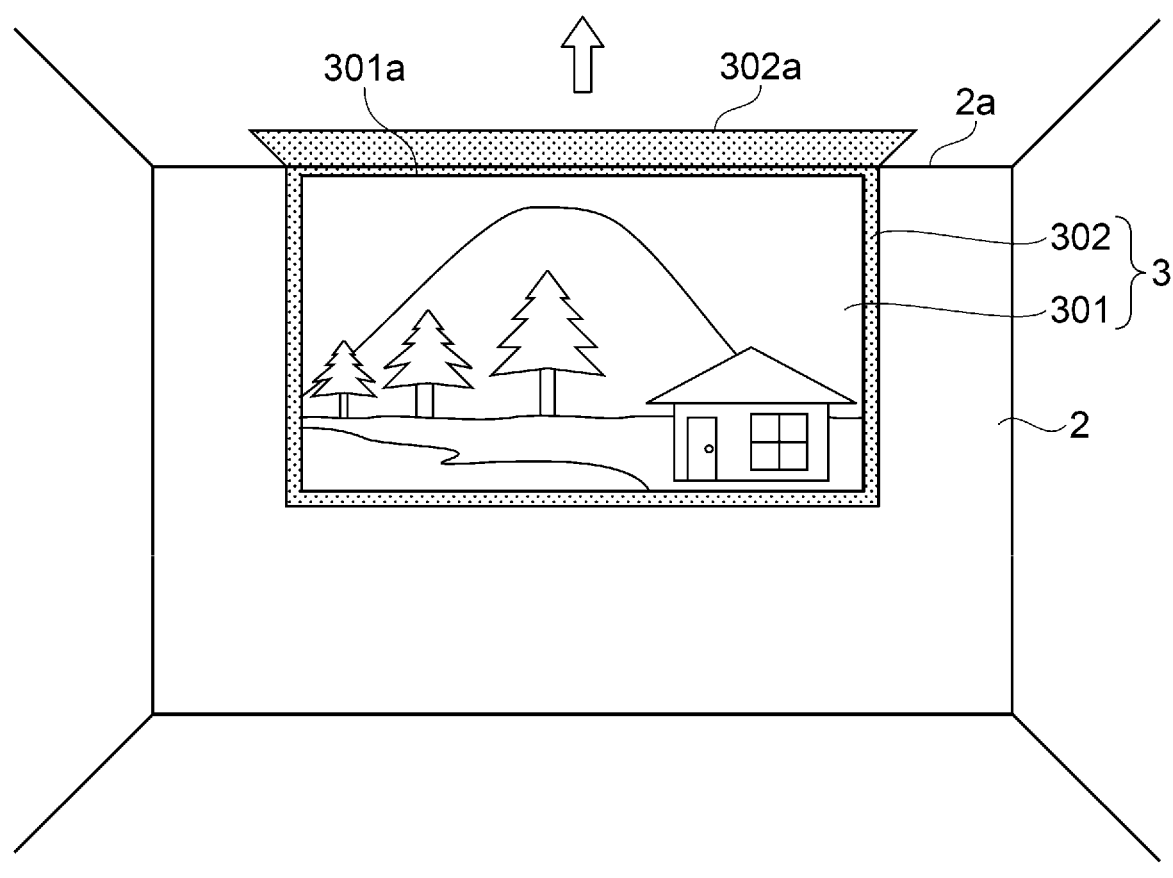
FIG. 6 shows a projection image displayed on the projection surface in the projection image adjustment.
Figure 6:
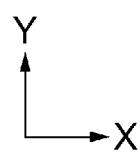
Figure 7:
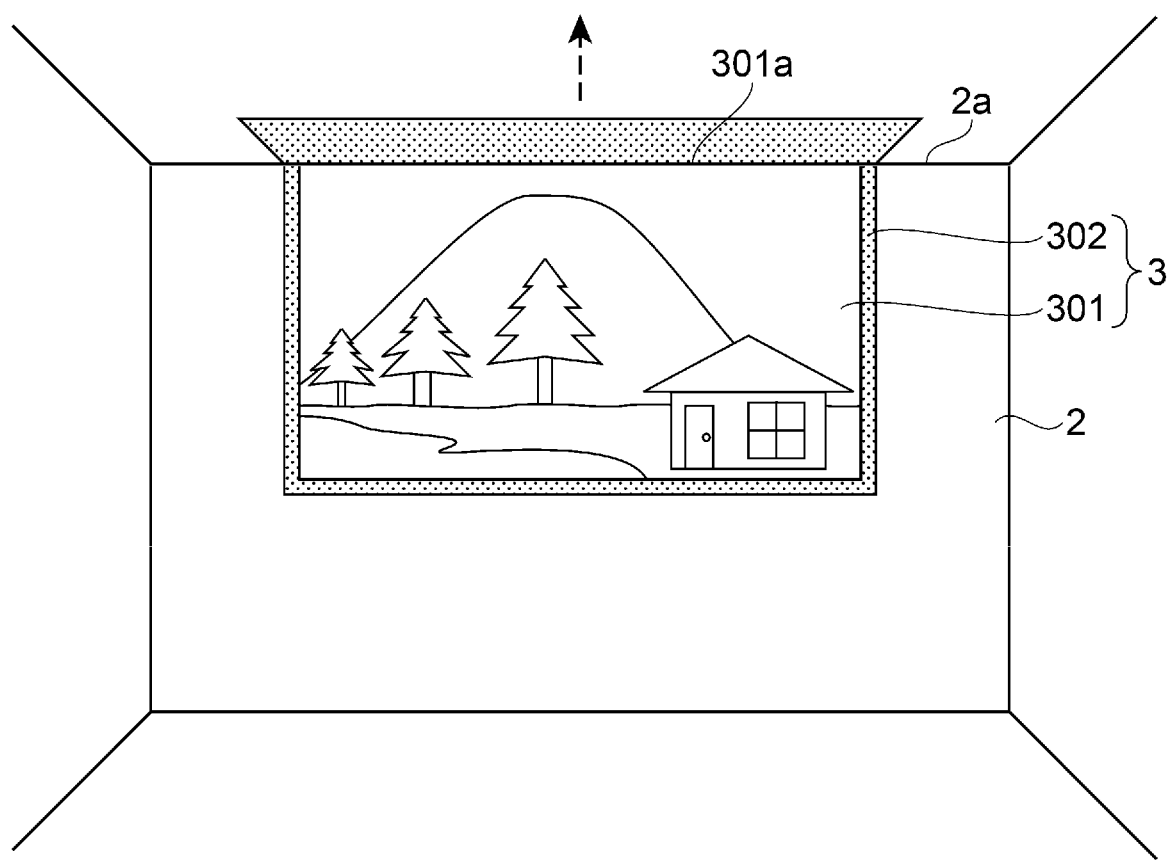
FIG. 7 shows a projection image displayed on the projection surface in the projection image adjustment.

FIG. 4 is a flowchart showing a projection image adjusting method according to the present embodiment. FIGS. 5 to 7 each show a projection image displayed on the projection surface in the projection image adjustment. The projection image adjusting method will be described below with reference to FIGS. 4 to 7.

In the case where the projection image 3 is projected on the projection surface 2, as shown in FIG. 5, and when the user presses the cursor key in the menu screen to select the lens shift process, the action of the lens shift process starts in accordance with the procedure shown in FIG. 4.

In step S11, the controller 20 determines the direction in which the projection lens 13 is moved in accordance with the cursor key pressed by the user. For example, when the user presses a portion of the cursor key that is the portion corresponding to the upward direction, the direction in which the projection image 3 is moved is determined to be the upward direction.

In step S12, the controller 20 causes the image processor 42 to display the test pattern 302 in addition to the image 301 projected on the projection surface 2. The test pattern 302 is so displayed as to surround the image 301, as shown in FIG. 5.

In step S13, the controller 20 instructs the lens shift driver 35 to move the projection lens 13 at the reference speed in the determined direction. That is, the projection image 3 is moved upward at the reference speed.

In step S14, the controller 20 instructs the imaging controller 36 to cause the imager 43 to capture images of the projection surface 2. The imager 43 captures images of the projection surface 2 at predetermined intervals.

In step S15, the controller 20 causes the detector 21 to detect a change in the test pattern 302 based on the captured image captured by the imager 43.

In step S16, the evaluator 22 evaluates whether or not the projection image 3 has reached the end 2a of the projection surface 2 based on the change in the test pattern 302 detected by the detector 21. In a case where the amount of change in the test pattern 302 detected by the detector 21 is greater than or equal to a predetermined value, the evaluator 22 determines that the projection image 3 has reached the end 2a of the projection surface 2. Therefore, for example, when the test pattern 302 slightly changes due to small irregularities of the projection surface 2, the evaluator 22 does not determine that the projection image 3 has reached the end 2a. On the other hand, when the projection image 3 is projected over an area of the projection surface 2 combined with a surface adjacent thereto, a captured image of the test pattern 302 is greatly distorted, and the evaluator 22 therefore determines that the projection image 3 has reached the end 2a of the projection surface 2. The evaluation criterion described above can prevent a determination error. Having determined that the projection image 3 has reached the end 2a of the projection surface 2, the evaluator 22 proceeds to the process in step S17. In a case where the projection image 3 has not reached the end 2a of the projection surface 2, the evaluator 22 proceeds to the process in step S23.

In step S17, the controller 20 causes the lens shift driver 35 to terminate the upward movement of the projection lens 13. That is, the upward movement of the projection image 3 is terminated, and, for example, the state in which the end 2a of the projection surface 2 falls within the test pattern 302 is achieved, as shown in FIG. 6.

In step S18, the moving speed changer 23 causes the lens shift driver 35 to change the moving speed at which the projection lens 13 is moved from the reference speed to the low speed.

In step S19, the controller 20 waits for the user's operation of the cursor key and determines again based on the pressed cursor key the direction in which the projection lens 13 is moved. For example, when the end 301a of the image 302 has not reached the end 2a of the projection surface 2, the user operates a portion of the cursor key that is the portion corresponding to the upward direction to move the projection image 3 slightly further upward, as shown in FIG. 6. On the other hand, when the end 301a of the image 301 has passed over the end 2a of the projection surface 2, the user operates a portion of the cursor key that is the portion corresponding to the downward direction to move the projection image 3 slightly further downward.

In step S20, the controller 20 causes the lens shift driver 35 to move the projection lens 13 at the low speed to which the moving speed changer 23 has changed the moving speed. For example, the controller 20 causes the lens shift driver 35 to move the projection image 3 upward, as shown in FIG. 7.

In step S21, the controller 20 evaluates whether or not the user desires to terminate the movement of the projection image 3. In a case where the user desires to terminate the movement, the controller 20 proceeds to the process in step S22. In a case where the user does not desire to terminate the movement, the controller 20 repeats the process in step S21. Specifically, when the user is pressing the cursor key, the controller 20 determines that the user does not desire to terminate the movement of the projection image 3. In a case where the user is not pressing the cursor key, the controller 20 determines that the user desires to terminate the movement of the projection image 3.

In step S22, the controller 20 causes the lens shift driver 35 to terminate the movement of the projection lens 13. As a result, the projection image 3 stops moving, and the lens shift process is terminated.

In a case where the evaluator 22 determines in step S16 that the projection image 3 has not reached the end 2a of the projection surface 2, and the evaluator 22 proceeds to the process in step S23, the evaluator 22 evaluates whether or not the user desires to terminate the lens shift process. In a case where the user desires to terminate the lens shift process, the controller 20 proceeds to the process in step S22 and terminates the lens shift process. In a case where the user does not desire to terminate the lens shift process, the controller 20 repeats the process in step S16.

As described above, the projection image adjusting method and the projector 1 according to the first embodiment can provide the following effects.

(1) According to the first embodiment, when the test pattern 302 changes, the evaluator 22 determines that the projection image 3 has reached the end 2a of the projection surface 2, and the controller 20 causes the lens shift driver 35 to terminate the movement of the projection image 3 in the first direction, whereby a situation in which the projection image 3 extends off the projection surface 2 by a large amount can be avoided. Further, the controller 20 causes the lens shift driver 35 to change the speed at which the projection image 3 is moved from the reference speed to the low speed, whereby the position of the projection image 3 can be readily adjusted.

(2) According to the first embodiment, the test pattern 302 is so disposed as to surround the projection image 3, whereby the state in which the projection image 3 has reached the end 2a of the projection surface 2 can be quickly detected.

(3) The first embodiment, in which the evaluator 22 determines based on a change in the test pattern 302 that the projection image 3 has reached the end 2a of the projection surface 2, is useful, for example, under a dark environment that does not allow detection of the end 2a of the projection surface 2.

Second Embodiment

A projector according to a second embodiment will be described below.

The projector 1 according to the present embodiment has the same configuration as that in the first embodiment (see FIG. 3) but does not include the lens shift adjustment mechanism 51 or the lens shift driver 35, which drives the lens shift adjustment mechanism 51. The projector 1 according to the present embodiment is instead configured to be capable of performing a simple size adjustment function and a simple position adjustment function.

The simple size adjustment function allows adjustment of the size of the projection image 3 (hereinafter also referred to as "screen size") on the projection surface 2. The simple size adjustment function allows electronic adjustment of the screen size. The simple position adjustment function allows adjustment of the position where the projection image 3 is projected on the projection surface 2, as does the lens shift adjustment mechanism 51. It is, however, noted that the lens shift adjustment mechanism 51 optically adjusts the projection position, whereas the simple position adjustment function allows electronic adjustment of the projection position.

Figure 8:
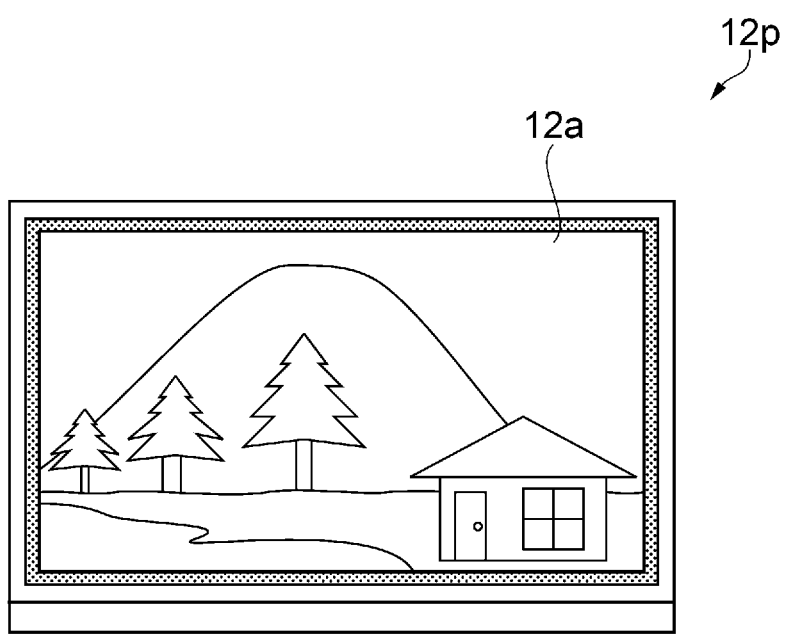
FIG. 8 is a descriptive diagram for describing a simple size adjustment function.
Figure 9:
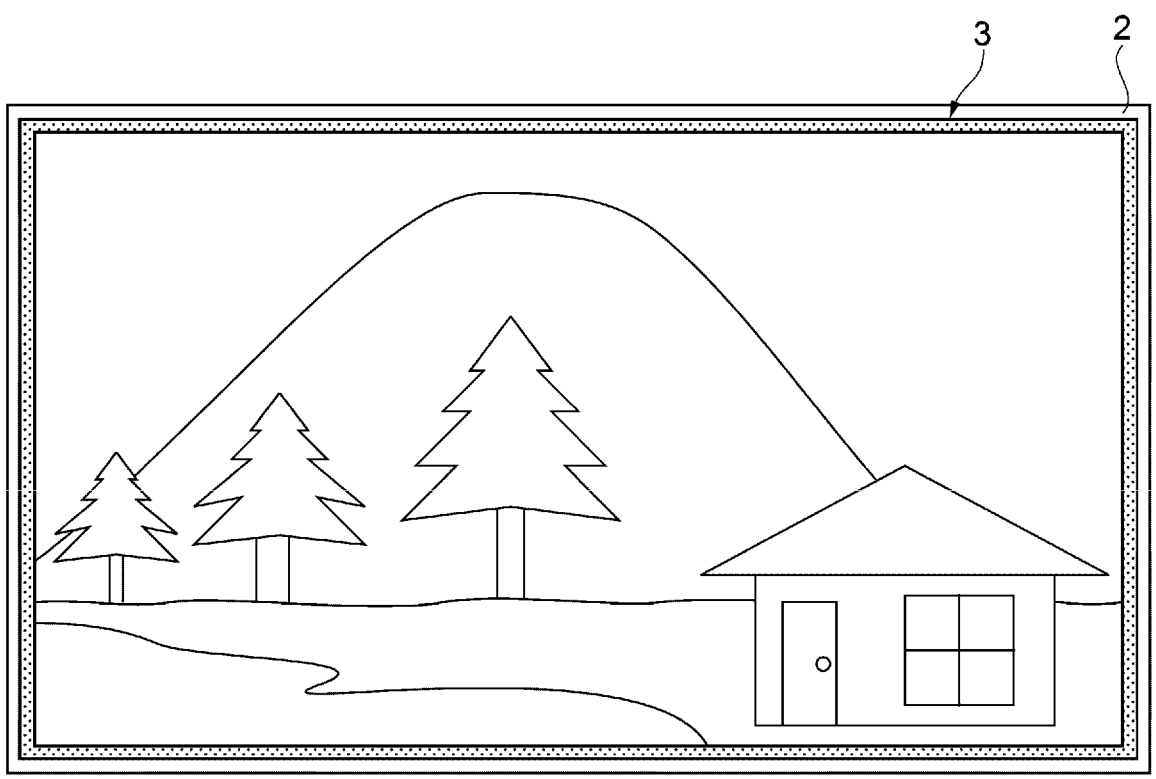
FIG. 9 is a descriptive diagram for describing the simple size adjustment function.
Figure 10:
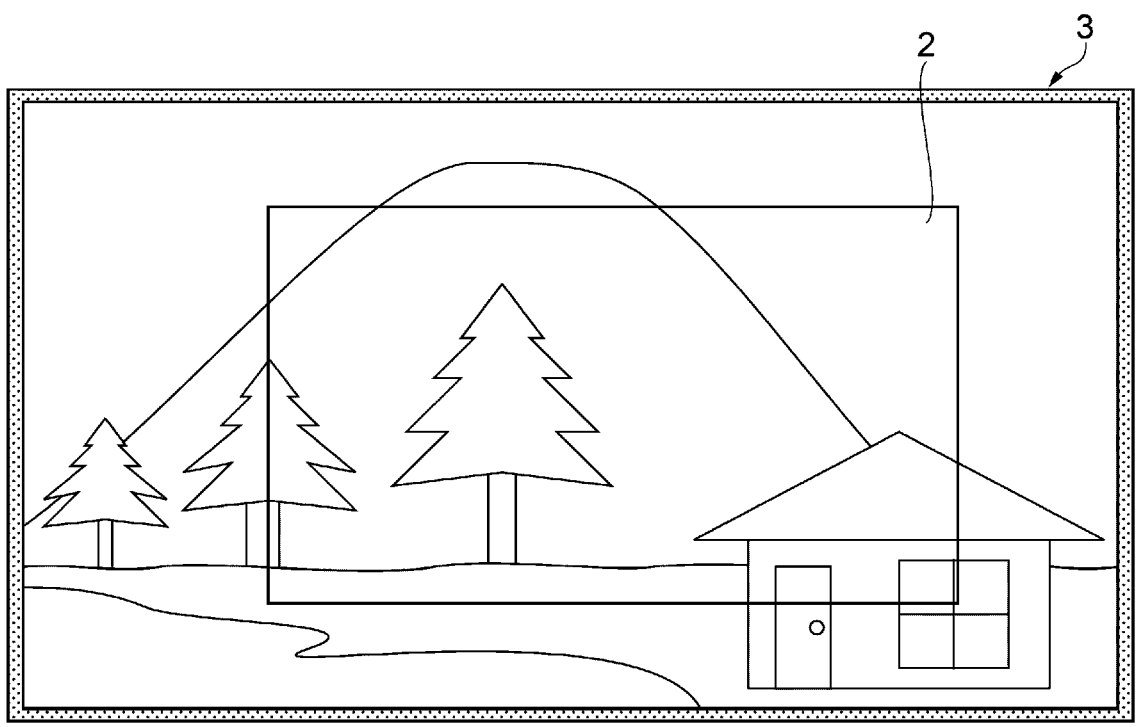
FIG. 10 is a descriptive diagram for describing the simple size adjustment function.
Figure 11:
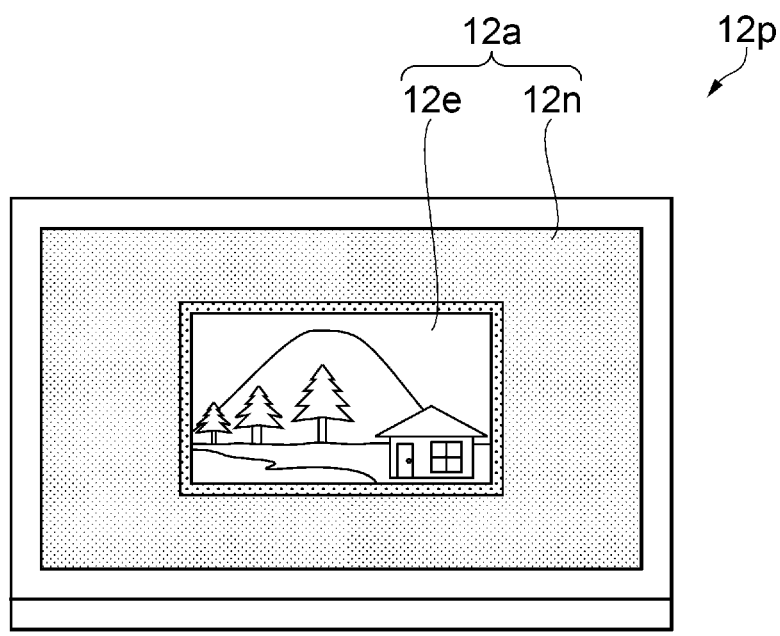
FIG. 11 is a descriptive diagram for describing the simple size adjustment function.
Figure 12:
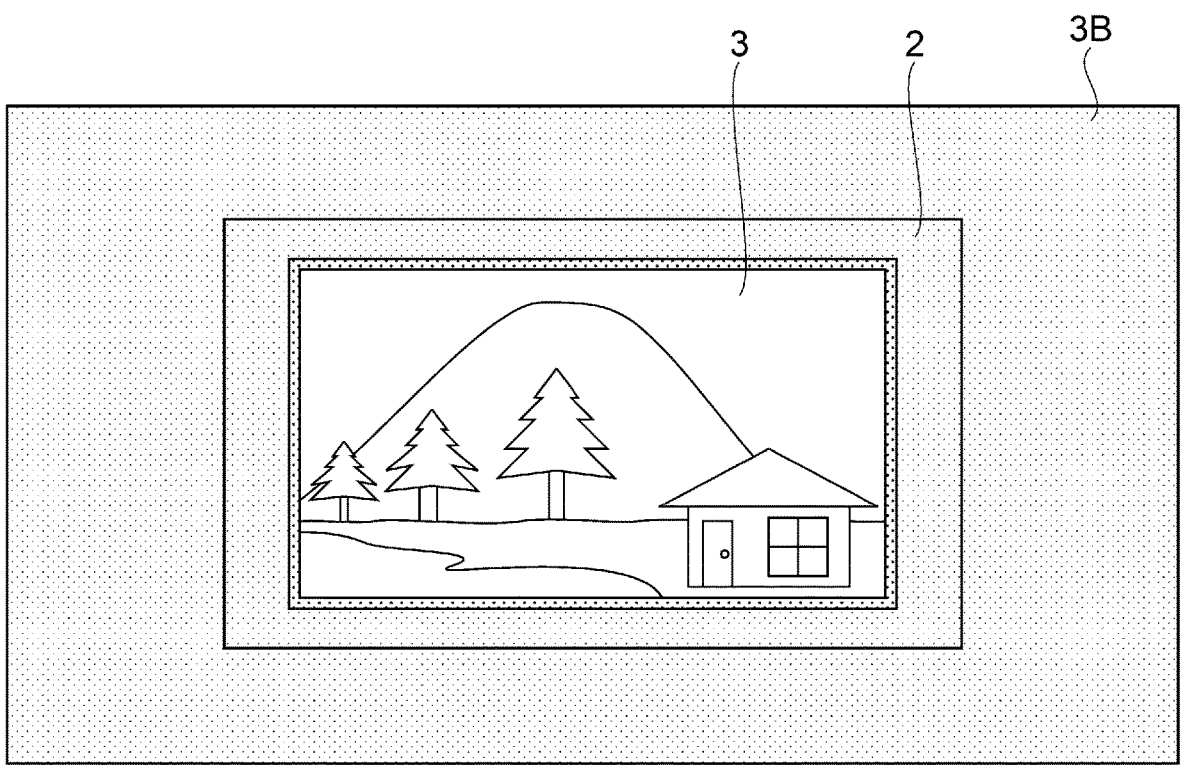
FIG. 12 is a descriptive diagram for describing the simple size adjustment function.

FIGS. 8 to 12 are each a descriptive diagram for describing the simple size adjustment function. Among the figures, FIGS. 8 and 11 each show a liquid crystal panel 12p provided in the liquid crystal light valve 12. FIGS. 9, 10, and 12 each show the projection image 3 projected on the projection surface 2. In the present embodiment, the projection surface 2 is, for example, a screen installed in front of a wall.

The liquid crystal panel 12p has a rectangular pixel area 12a formed therein as shown in FIGS. 8 and 11, and the pixel area 12a includes a plurality of pixels that are not shown but are arranged in a matrix. The pixels in the pixel area 12a are each so set when driven by the light valve driver 14 as to have optical transmittance according to the image signal. Therefore, when the light having passed through the pixel area 12a is projected on the projection surface 2, the projection image 3 according to the image signal is displayed on the projection surface 2.

Setting the optical transmittance at which the pixels in the pixel area 12a transmit light to display the projection image 3 is hereinafter expressed also as "forming the projection image 3 in the pixel area 12a." The orientation of an image on the liquid crystal panel 12p does not necessarily coincide with the orientation of an image on the projection surface 2, but the two images have the same orientation in FIGS. 8 to 12 in the following figures for simplification of the description.

To display the projection image 3 having a large size with high definition, it is desirable to use the entire pixel area 12a of the liquid crystal panel 12p to form the projection image 3, as shown in FIGS. 8 and 9. In a case where the projection image 3 is so projected as to be larger than the projection surface 2 due, for example, to restriction on the distance between the projector 1 and the projection surface 2 or restriction on the size of the projection surface 2, as shown in FIG. 10, the simple size adjustment function allows reduction in the screen size.

The simple size adjustment function is the function of adjusting the screen size by setting a rectangular image formation area 12e smaller than the pixel area 12a and forming the projection image 3 in the image formation area 12e as shown in FIGS. 11 and 12. For example, the projector 1 allows multi-stepwise adjustment of the screen size over a range from a magnification of 0.5 to 1.0. The controller 20 retains size adjustment values representing the screen size steps and outputs any of the size adjustment values to the image processor 42, and the image processor 42 changes the screen size in accordance with the inputted size adjustment value.

A telescopic view key and a wide-angle view key are disposed on the operation acceptor 32 and the remote control 50 in the present embodiment, and the user can operate the keys to change the screen size. When the user operates the telescopic view key, the controller 20 changes the size adjustment value to another that reduces the current screen size by one step and outputs the changed size adjustment value to the image processor 42.

When the user operates the wide-angle view key, the controller 20 changes the size adjustment value to another that increases the current screen size by one step and outputs the changed size adjustment value to the image processor 42. When the telescopic view key is operated in the state in which the screen size has been minimized, or the wide-angle view key is operated in the state in which the screen size has been maximized, the size adjustment value is not changed, and the current screen size is maintained.

The image processor 42 sets the image formation area 12e having a size according to the size adjustment value inputted from the controller 20 in the pixel area 12a and processes the image data inputted from the image signal input section 41 in such a way that an image according to the image data is formed in the set image formation area 12e.

Specifically, when the screen size is smaller than the maximum screen size, the image processor 42 thins the image data subsequently inputted from the image signal input section 41 to reduce the image to form an image in the set image formation area 12e. Further, the image processor 42 draws the area outside the image formation area 12e (invalid area 12n) in black, that is, in a color that provides minimum optical transmittance.

As a result, the projection image 3 based on the image signal can be displayed in a size that allows the projection image 3 to fall within the projection surface 2, as shown in FIG. 12. In this case, an area 3B outside the projection image 3, that is, an area 3B corresponding to the invalid area 12n is drawn in black, and the user is therefore unlikely to visually recognize the area 3B.

Figure 13:
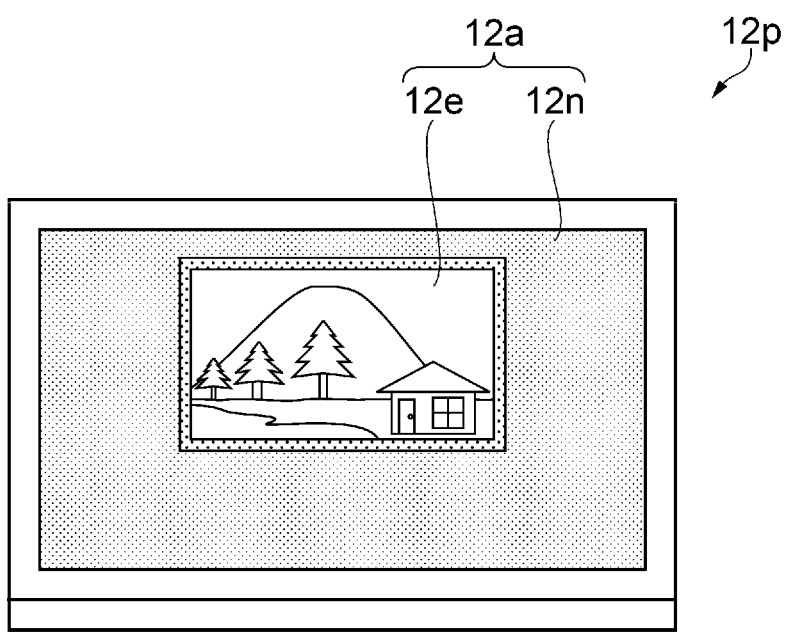
FIG. 13 is a descriptive diagram for describing a simple position adjustment function.
Figure 14:
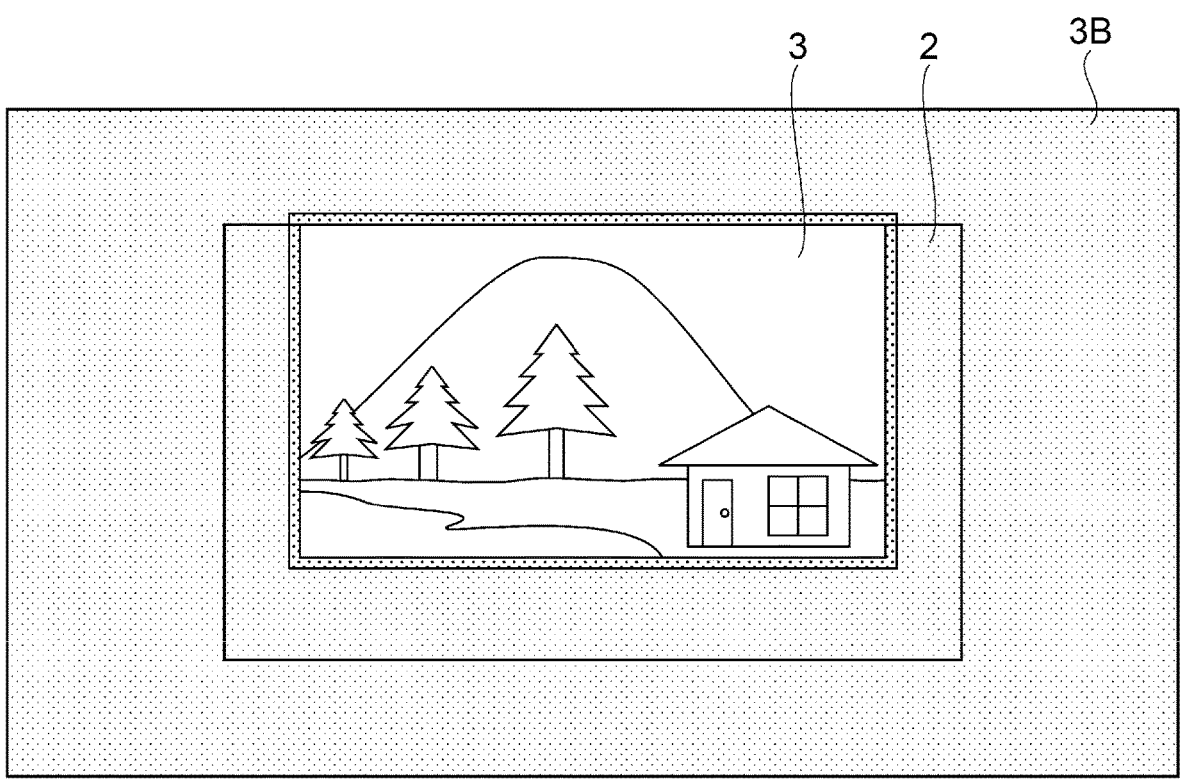
FIG. 14 is a descriptive diagram for describing the simple position adjustment function.

FIGS. 13 and 14 are each a descriptive diagram for describing the simple position adjustment function. FIG. 13 shows the liquid crystal panel 12p, and FIG. 14 shows a projection image projected on the projection surface.

The simple position adjustment function is the function of adjusting the position of the projection image 3 on the projection surface 2 by changing the position of the image formation area 12e in the pixel area 12a when the screen size has been so set by the simple size adjustment function as to be smaller than the maximum screen size, as shown in FIGS. 13 and 14. The controller 20 retains coordinate information representing the coordinates of a predetermined position (center position, for example) in the image formation area 12e, and when the controller 20 outputs the coordinate information to the image processor 42, the image processor 42 changes the position of the image formation area 12e in accordance with the inputted coordinate information.

In the present embodiment, when the user selects a predetermined item in the menu screen displayed by the user's pressing of the menu key, the controller 20 projects a position adjustment screen that is not shown as an OSD image. The user can then press the cursor key with the position adjustment screen displayed to adjust the position of the projection image 3.

When the user presses the cursor key, the controller 20 updates the coordinate information in such a way that the image formation area 12e moves by a predetermined amount in a direction corresponding to a portion of the cursor key that is the portion pressed by the user and outputs the updated coordinate information to the image processor 42, as shown in FIG. 13. The image processor 42 then moves the position of the image formation area 12e based on the coordinate information from the controller 20.

That is, the image processor 42 sets the image formation area 12e in the position based on the updated coordinate information in the pixel area 12a and processes the image data inputted from the image signal input section 41 in such a way that an image according to the image data is formed in the set image formation area 12e. As a result, the projection image 3 projected on the projection surface 2 also moves in the direction corresponding to a portion of the cursor key that is the portion pressed by the user, as shown in FIG. 14. FIGS. 13 and 14 show the state after the user operates a portion of the cursor key that is the portion corresponding to the upward direction in the state shown in FIGS. 11 and 12. The user can keep pressing the cursor key to continuously move the projection image 3.

The procedure of the action of the projector 1 according to the present embodiment is the same as that in the first embodiment except how to move the projection image 3 on the projection surface 2, that is, the movement is performed by the lens shift or the simple position adjustment function, and no description of the action procedure will therefore be described. That is, also in the present embodiment, the controller 20 operates in accordance with the flowchart shown in FIG. 4.

That is, when the user uses the simple position adjustment function to move the projection image 3 in the first direction based on the user's operation, and an image of the test pattern 302 is captured and a change in the captured test pattern 302 is detected, the controller 20 determines that the end 3a of the projection image 3 has reached the end 2a of the projection surface 2 and terminates the movement of the projection image 3 in the first direction.

Further, when the coordinate information is updated in accordance with the user' pressing of the cursor key, the moving speed changer 23 reduces the amount of movement of the image formation area 12e per single pressing operation to a value smaller than the amount of movement before the termination of the movement. That is, keeping pressing the cursor key reduces the amount of movement per unit time, and the speed at which the projection image 3 is moved decreases accordingly.

In the first embodiment described above, the lens shift adjustment mechanism 51 and the lens shift driver 35 correspond to the position adjuster that adjusts the position of the projection image 3 on the projection surface 2, whereas in the present embodiment, the image processor 42 that changes the position of the image formation area 12e, that is, the position of the projection image 3 in accordance with the coordinate information inputted from the controller 20 corresponds to the position adjuster.

As described above, the method for adjusting the projection image 3 and the projector 1 according to the second embodiment can provide the following effect.

(4) The simple position adjustment function in the second embodiment also provides the same effects as those provided by the first embodiment.

Variations

The embodiments described above may be changed as follows.

Figure 15:
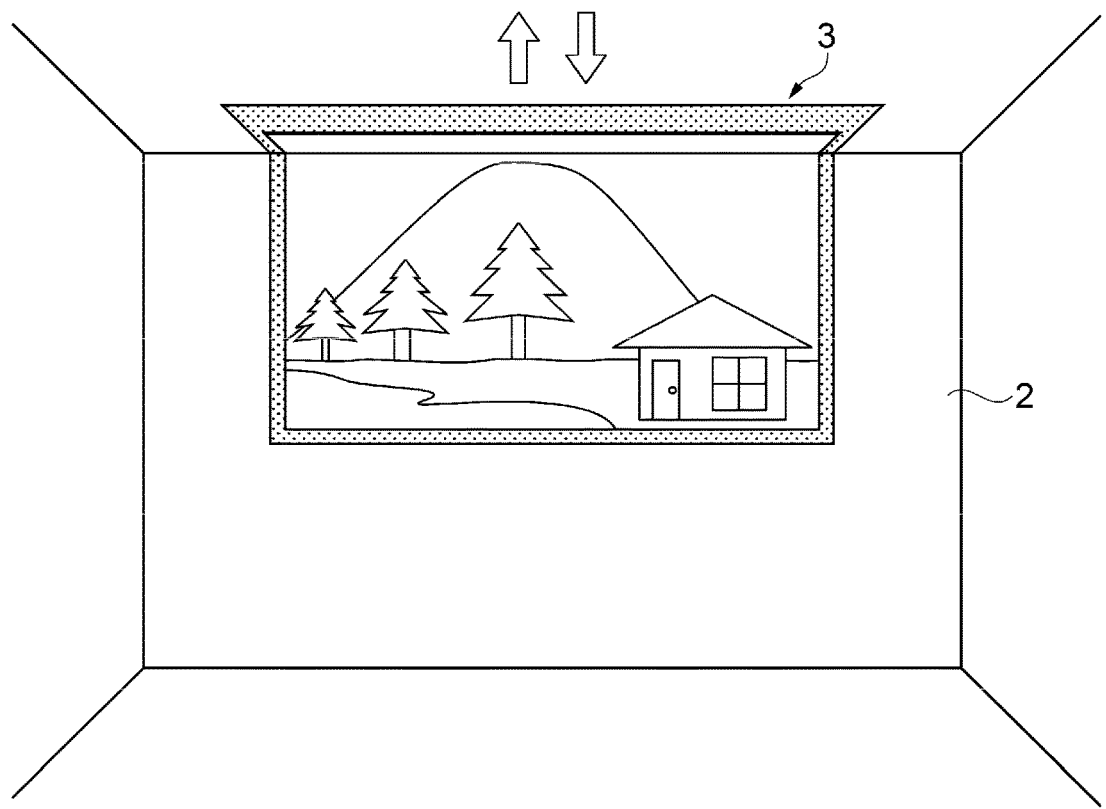
FIG. 15 shows a projection image displayed on the projection surface according to a variation.
Figure 15:
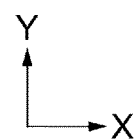

In the embodiments described above, when the projection image 3 is moved in the first direction and the detector 21 detects a change in the test pattern 302, the movement of the projection image 3 is terminated, but not necessarily, and the following action may be taken. FIG. 15 is a diagrammatic view showing a projection image adjusting method according to a variation. After the projection image 3 is moved in the first direction, and the detector 21 detects a change in the test pattern 302, so that the movement of the projection image 3 is terminated, the controller 20 may control the lens shift driver 35 to cause the projection image 3 to return by a predetermined distance, as shown in FIG. 15. The projection image 3 can thus be readily positioned with respect to the projection surface 2.

The aspect in which the movement of the projection image 3 in the first direction is suppressed is not limited to the aspect in which the movement of the projection image 3 is terminated, and an aspect in which the movement of the projection image 3 is not terminated but the moving speed is reduced may be employed.

Figure 16:
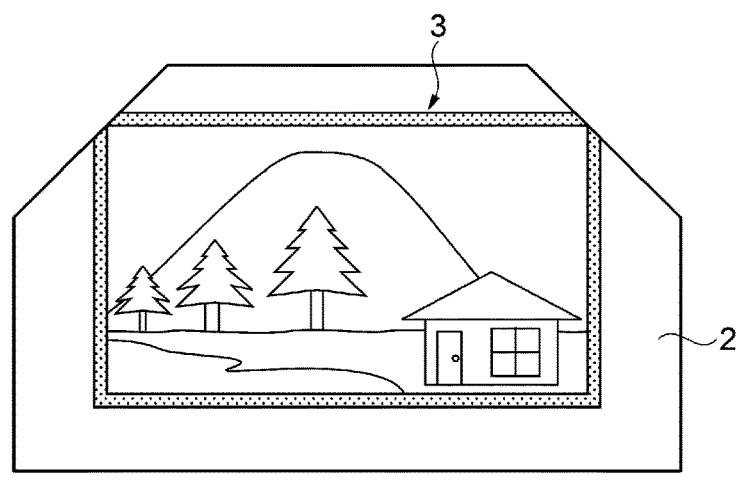
FIG. 16 shows a projection image displayed on the projection surface according to another variation.

In the embodiments described above, the projection surface 2 is a substantially oblong wall or screen, but not necessarily, and a projection image may be projected on a building having an irregular surface or on a trapezoidal projection surface 2, such as that shown in FIG. 16. In the case of a trapezoidal projection surface 2, as shown in FIG. 16, and when a change in any of the corners of the projection image 3 is detected, the projection image 3 is moved at the low speed both in the directions X and Y.

In the embodiments described above, the test pattern 302 is so disposed as to surround the image 301 in the projection image 3, but not necessarily, and the test pattern 302 may be disposed as follows: For example, test patterns may be disposed at the four corners of the image 301, or a test pattern may be disposed at part of the edges that form the image 301. Still instead, the entire projection image 3 may also serve as a test pattern. In this case, the projection position is determined based on the test pattern and only the image 301 is then projected.

In the embodiments described above, the width of the test pattern 302 in the projection image 3 is not specified, and the width of the test pattern 302 may be specified, for example, in accordance with the speed at which the projection image 3 is moved. It is preferable to select the width of the controller 20 as appropriate, for example, the width of the test pattern 302 is increased when the projection image 3 is moved at high speed, whereas the width of the test pattern 302 is reduced when the projection image 3 is moved at low speed.

In the embodiments described above, the test pattern 302 is formed of a thick line. The test pattern 302 may instead, be formed, for example of dots or a barcode, and a change in the number of dots, barcode elements, or any other objects may be detected.

In the embodiments described above, the color of the test pattern 302 is not specified. For example, the test pattern 302 may have a color that mates with the color of the projection surface 2, that is, a color that can be clearly distinguished from the color of the projection surface 2.

In the embodiments described above, the test pattern 302 is disposed along the four edges of the image 301, but not necessarily. For example, a test pattern may instead be disposed only along the end that faces in the moving direction. In this case, the position of the test pattern is changed when the moving direction is changed by the user's operation.

In the embodiments described above, the projection surface 2 may be a screen having a black frame. Also in this case, when the projection image 3 is so moved that the test pattern 302 overlaps with the black frame, the movement of the test pattern 302 can be detected as a change in the test pattern 302 because no light is reflected off the test pattern 302.

The contents derived from the embodiments will be described below.

A projection image adjusting method includes projecting a projection image including a test pattern on a projection surface, moving the projection image in a first direction, capturing an image of the projection image, detecting a change in the test pattern contained in the projection image the image of which has been captured, determining that the projection image has reached an end of the projection surface when a change in the test pattern is detected, and suppressing the movement of the projection image in the first direction when it is determined that the projection image has reached the end of the projection surface.

According to the method, when the test pattern changes, it is determined that an end of the projection image has reached an end of the projection surface, and the movement of the projection image is suppressed, whereby the situation in which the projection image extends off the projection surface by a large amount can be avoided. The position of the projection image to be projected can therefore be readily adjusted.

In the projection image adjusting method described above, the test pattern may be so disposed as to surround the projection image.

According to the method, the test pattern is so disposed as to surround the projection image, whereby the state in which the projection image has reached an end of the projection surface can be quickly detected.

In the projection image adjusting method described above, when the amount of change in the test pattern is greater than or equal to a predetermined value, it may be determined that the projection image has reached the end of the projection surface.

According to the method, it is determined that the test pattern has changed when the test pattern has changed by a large amount, whereby a determination error can be suppressed.

In the projection image adjusting method described above, when it is determined that the projection image has reached the end of the projection surface, the speed at which the projection image is moved may be changed from a reference speed to a low speed.

According to the method, the projection image moving speed at which the test pattern changes is changed from the reference speed to the low speed, whereby the projection image can be readily positioned with respect to the projection surface.

In the projection image adjusting method described above, when it is determined that the projection image has reached the end of the projection surface, the movement of the projection image may be terminated.

According to the method, the movement of the projection image is terminated when the test pattern changes, whereby the projection image can be readily positioned with respect to the projection surface.

In the projection image adjusting method described above, when it is determined that the projection image has reached the end of the projection surface, the projection image may be moved in a second direction that is opposite the first direction.

According to the method, the projection image is moved in the second direction, which is opposite the first direction, after the test pattern changes. Therefore, for example, when the test pattern has been moved by an excessive amount and therefore extends off the end of the projection surface, the position of the projection image is moved back, whereby the projection image can be readily positioned with respect to the projection surface.

A projection apparatus includes a projection section that projects a projection image including a test pattern on a projection surface, a position adjuster that moves the projected projection image in a first direction, an imager that captures an image of the projection image, a detector that detects a change in the test pattern contained in the projection image the image of which has been captured, an evaluator that determines that the projection image has reached an end of the projection surface when the detector detects a change in the test pattern, and a controller that suppresses the movement of the projection image moved in the first direction by the position adjuster when the evaluator determines that the projection image has reached an end of the projection surface.

According to the configuration described above, when the test pattern changes, it is determined that an end of the projection image has reached an end of the projection surface, the situation in which the projection image extends off the projection surface by a large amount can be avoided, for example, by changing the projection image moving speed or terminating the movement of the projection image when the projection image reaches the end of the projection surface. The position of the projection image to be projected can therefore be readily adjusted.

In the projection apparatus described above, the test pattern may be so disposed as to surround the projection image.

According to the configuration described above, the test pattern is so disposed as to surround the projection image, whereby a change in the test pattern can be quickly detected.

In the projection apparatus described above, when the amount of change in the test pattern detected by the detector is greater than or equal to a predetermined value, the evaluator may determine that the projection image has reached the end of the projection surface.

According to the configuration described above, it is detected that the test pattern has changed when the test pattern has changed by a large amount, whereby a determination error can be avoided.

In the projection apparatus described above, when the evaluator determines that the projection image has reached the end of the projection surface, the controller may cause the position adjuster to change the speed at which the projection image is moved from the reference speed to the low speed.

According to the configuration described above, the projection image moving speed at which the test pattern changes is changed from the reference speed to the low speed, whereby the projection image can be readily positioned with respect to the projection surface.

In the projection apparatus described above, when the evaluator determines that the projection image has reached the end of the projection surface, the controller may cause the position adjuster to terminate the movement of the projection image.

According to the configuration described above, the movement of the projection image is terminated when the test pattern changes, whereby the projection image can be readily positioned with respect to the projection surface.

In the projection apparatus described above, when the evaluator determines that the projection image has reached the end of the projection surface, the controller may cause the position adjuster to move the projection image in the second direction, which is opposite the first direction.

According to the configuration described above, the projection image is moved in the second direction, which is opposite the first direction, after the test pattern changes. Therefore, for example, when the test pattern has been moved by an excessive amount and therefore extends off the end of the projection surface, the position of the projection image is moved back, whereby the projection image can be readily positioned with respect to the projection surface.

What is claimed is:

1. A projection image adjusting method comprising:
projecting a projection image including a test pattern on a projection surface;
moving the projection image in a first direction;
capturing an image of the projection image;
detecting a change in the test pattern contained in the projection image the image of which has been captured;
determining that the projection image has reached an end of the projection surface when a change in the test pattern is detected; and
suppressing the movement of the projection image in the first direction when it is determined that the projection image has reached the end of the projection surface,
wherein when it is determined that the projection image has reached the end of the projection surface, a speed at which the projection image is moved is changed from a reference speed to a low speed.

2. The projection image adjusting method according to claim 1,
wherein the test pattern is so disposed as to surround the projection image.

3. The projection image adjusting method according to claim 1,
wherein when an amount of change in the test pattern is greater than or equal to a predetermined value, it is determined that the projection image has reached the end of the projection surface.

4. The projection image adjusting method according to claim 1,
wherein when it is determined that the projection image has reached the end of the projection surface, the movement of the projection image is terminated.

5. A projection image adjusting method comprising:
projecting a projection image including a test pattern on a projection surface;
moving the projection image in a first direction;
capturing an image of the projection image;
detecting a change in the test pattern contained in the projection image the image of which has been captured;
determining that the projection image has reached an end of the projection surface when a change in the test pattern is detected; and
suppressing the movement of the projection image in the first direction when it is determined that the projection image has reached the end of the projection surface,
wherein when it is determined that the projection image has reached the end of the projection surface, the projection image is moved in a second direction that is opposite the first direction.

6. A projection apparatus comprising:
a projection section that projects a projection image including a test pattern on a projection surface;
a position adjuster that moves the projected projection image in a first direction;
an imager that captures an image of the projection image;
a detector that detects a change in the test pattern contained in the projection image the image of which has been captured,
an evaluator that determines that the projection image has reached an end of the projection surface when the detector detects a change in the test pattern; and
a controller that suppresses the movement of the projection image moved in the first direction by the position adjuster when the evaluator determines that the projection image has reached the end of the projection surface,
wherein when the evaluator determines that the projection image has reached the end of the projection surface, the controller causes the position adjuster to change a speed at which the projection image is moved from a reference speed to a low speed.

7. The projection apparatus according to claim 6,
wherein the test pattern is so disposed as to surround the projection image.

8. The projection apparatus according to claim 6,
wherein when an amount of change in the test pattern detected by the detector is greater than or equal to a predetermined value, the evaluator determines that the projection image has reached the end of the projection surface.

9. The projection apparatus according to claim 6,
wherein when the evaluator determines that the projection image has reached the end of the projection surface, the controller causes the position adjuster to terminate the movement of the projection image.

10. The projection apparatus according to claim 6,
wherein when the evaluator determines that the projection image has reached the end of the projection surface, the controller causes the position adjuster to move the projection image in a second direction that is opposite the first direction.

* * * * *